COMBINATION WINDOW WASHER, SCRAPER AND SQUEEGEE

Filed Nov. 1, 1966 2 Sheets-Sheet 1

INVENTOR.
HERBERT A. SIEMUND
BY Richard J. Rawling
ATTORNEY

Oct. 22, 1968 H. A. SIEMUND 3,406,420

COMBINATION WINDOW WASHER, SCRAPER AND SQUEEGEE

Filed Nov. 1, 1966 2 Sheets-Sheet 2

INVENTOR.
HERBERT A. SIEMUND

BY

ATTORNEY

United States Patent Office 3,406,420

Patented Oct. 22, 1968

3,406,420

COMBINATION WINDOW WASHER, SCRAPER AND SQUEEGEE

Herbert A. Siemund, Skokie, Ill., assignor to Greenview Manufacturing Company, Chicago, Ill., a corporation of Illinois Filed Nov. 1, 1966, Ser. No. 591,219
6 Claims. (Cl. 15—121)

ABSTRACT OF THE DISCLOSURE

A light weight cleaning implement having a manipulating handle, a rubber squeegee and a pair of absorbent roll shaped sponges covered with a tight encircling reticulated member capable of rendering an abrasive action against the surface being cleaned while the sponges exude water or other cleaning liquid to lubricate the surface thereof.

The present invention relates generally to a cleaning implement, and it has particular relation to a combination washer, scraper and squeegee adapted primarily for the cleaning of automobile windshields, windows, painted surfaces and the like.

Heretofore, cleaning devices of the general character have been made combining a sponge rubber or felt pad and a rubber squeegee, but such devices were inefficient and incapable of removing dried insect remains from a windshield or painted surfaces of an automobile since they provided no abrasive surface capable of scraping the dried remains therefrom.

The invention combines a single implement having a manipulating handle, a pair of spaced roll shaped sponge-like blades provided with a tight-fitting mesh or netting material for effectively removing insects and other solid particles from a surface to be cleaned, and a rubber scraper-blade or squeegee for drying the freshly cleaned surface.

An object of the invention is to provide in a cleaning implement a pair of spaced resilient roll shaped sponge portions having a covering material of a netting capable for use in removing firmly adhering dirt and the like from a surface to be cleaned such as a windshield of an automobile.

Another object of the present invention is to provide an inexpensive, efficient, durable and light weight cleaning implement having a manipulating handle, a rubber squeegee and a pair of absorbent roll shaped sponges covered with a tight fitted netting capable of rendering an abrasive action against the surface being cleaned while the sponge portion exudes water or other cleaning liquid to lubricate the surface thereof.

A further object of the invention is to provide in such a cleaning implement a lightweight and durable frame structure, whereby the spaced juxtaposed roll shaped sponges and the rubber squeegee blade can be secured permanently in spaced relation to the frame structure in an efficient, durable and inexpensive manner.

Another object of the invention is the provision of a pair of juxtaposed roll shaped sponges of a substantial length as compared to their cross sectional dimension made from a rectangular piece of foam rubber of substantial length as compared to its width and a substantial width as compared to its thickness dimensions by stitching a tight-fitting mesh or netting therearound while leaving seam edges or flaps suitable for mounting on a frame structure, said mesh or netting covered sponge being also stitched toogether along its longitudinal avis to form a pair of juxtaposed roll shaped sponges which can be used one at a time during the cleaning operation, whereby the sponge roll not being used provides an auxiliary reservoir of cleaning liquid should additional cleaning liquid be required in the cleaning and scraping operation.

A further object of the invention is to provide in such a cleaning implement a spaced pair of backing plates so arranged so that one each will support a roll shaped sponge when the same is engaging a surface to be cleaned.

Another object of the invention is the provision of a clamping implement including a pair of juxtaposed resilient roll shaped water absorbing sponges having a covering of netting material for abrasively removing firmly adhering insect bodies, dirt and the like from a window or painted surface to be cleaned without marring the surface thereof, and a rubber squeegee blade for removing water from the surface being cleaned, said cleaning implement having a frame structure provided with a manipulating handle extending backwardly and outwardly therefrom, a bifurcation at one end of the frame structure for receiving and securing said rubber squeegee therein and a bifurcation at the opposite end for receiving and securing the seam edges or flaps of the netting material therein.

A further object of the invention is the provision in such a cleaning implement of a plurality of stitches of thread extending in a longitudinal line through the sponge and covering netting material to form a pair of juxtaposed roll shaped portions of the sponge, said netting material having a width that is smaller in dimensions than the length of said sponge material whereby the sponge material outside of said netting forms a marginal finishing bead.

Other and further objects of the invention reside in the detailed construction of the cleaning implement, which result in simplicity, economy and efficiency, and which will be apparent from the following description, wherein a preferred form of embodiment of the invention is shown. It is to be understood, however, that the drawings are for the purpose of illustration only and are not a definition of the limits of the invention, reference being had to the appended claims for this purpose.

Referring now to the drawings, wherein like numerals indicate like parts:

Figure 5:
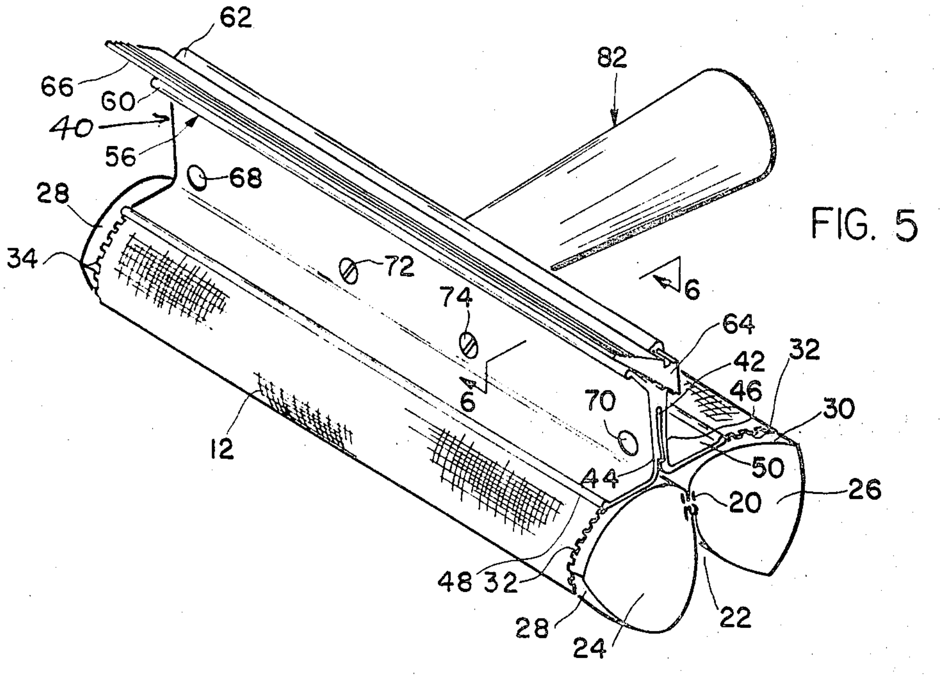
FIGURE 5 is a perspective view of a window cleaning implement constructed in accordance with the principles of the invention.
Figures 6, 7:
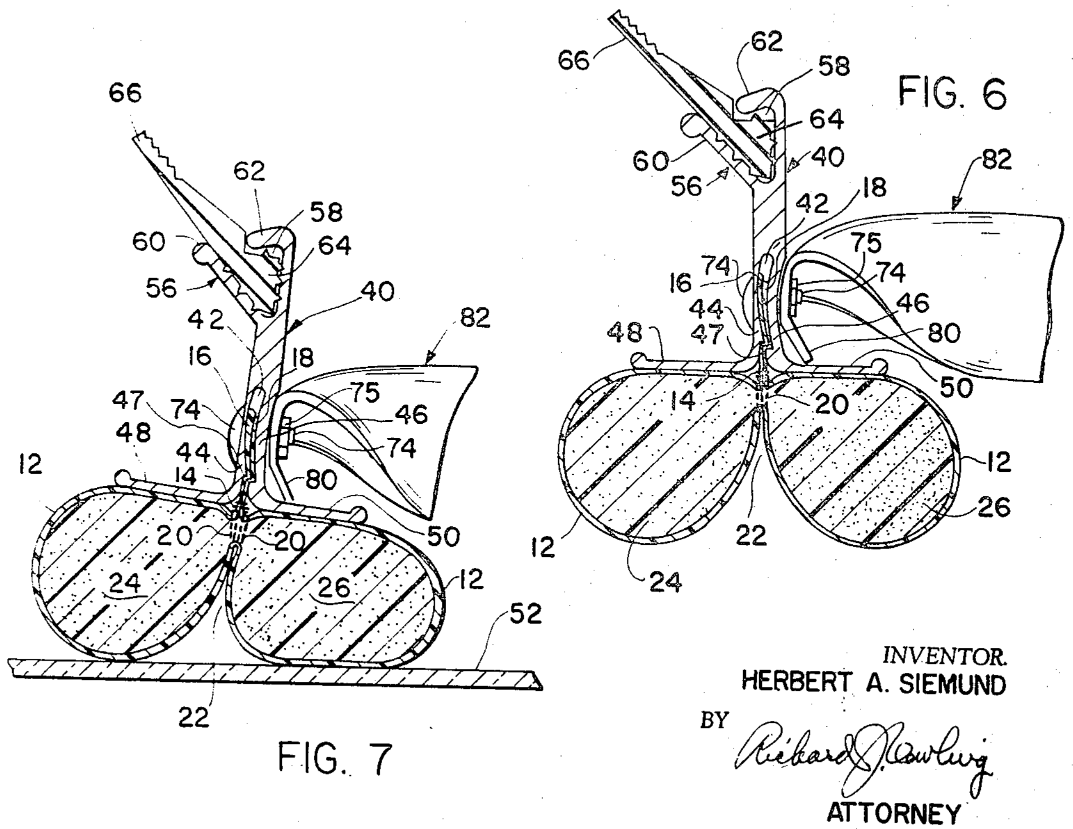

FIGURE 6 is an enlarged cross-sectional view of the window cleaning implement shown in FIGURE 5, the same having been taken substantially along the line 6—6 thereof, looking in the direction of the arrows, showing the squeegee blade, the spaced roll shaped sponges, the backing plates for the sponges, an operating handle for the implement, and the fastening means for jointly securing the operating handle and the intermediate portions of the fastening plates; and FIGURE 7 is a fragmentary cross-sectional view of the cleaning implement similar to FIGURE 6, but showing one of the roll shaped sponge portions with its encompassing netting material compressed against a glass window surface to be cleaned, such as a windshield of an automobile, and in cleaning relation therewith while the other roll shaped sponge portion is being held in spaced relation thereto.

In the cleaning implement of the present invention, there is provided a rectangular sponge block or member having a substantial length as compared to its width and a substantial width as compared to its thickness dimensions, which may be of natural sponge, expanded cellulosic material known as artificial sponge, polyester sponge, foam rubber sponge or similar water absorbent compressible materials indicated generally by the numeral 10.

Encompassing the rectangular water absorbent material 10 is a relatively stiff abrasive covering member of a synthetic fibre mesh netting or screen, which is indicated in the drawing by the numeral 12. The reticulated material 12, while sufficiently abrasive, in the presence of water, to remove dried insect remains, dirt and the like from glass or highly painted surfaces, is sufficiently soft so as not to scratch glass or highly painted surfaces and the like, such as a windshield or the painted surfaces of an automobile. Thus, the backing layer or the netting 12 should be softer than the surface to be cleaned and yet sufficiently stiff to retain the sponge portions in their juxtaposed roll shape.

Figures 1, 2:
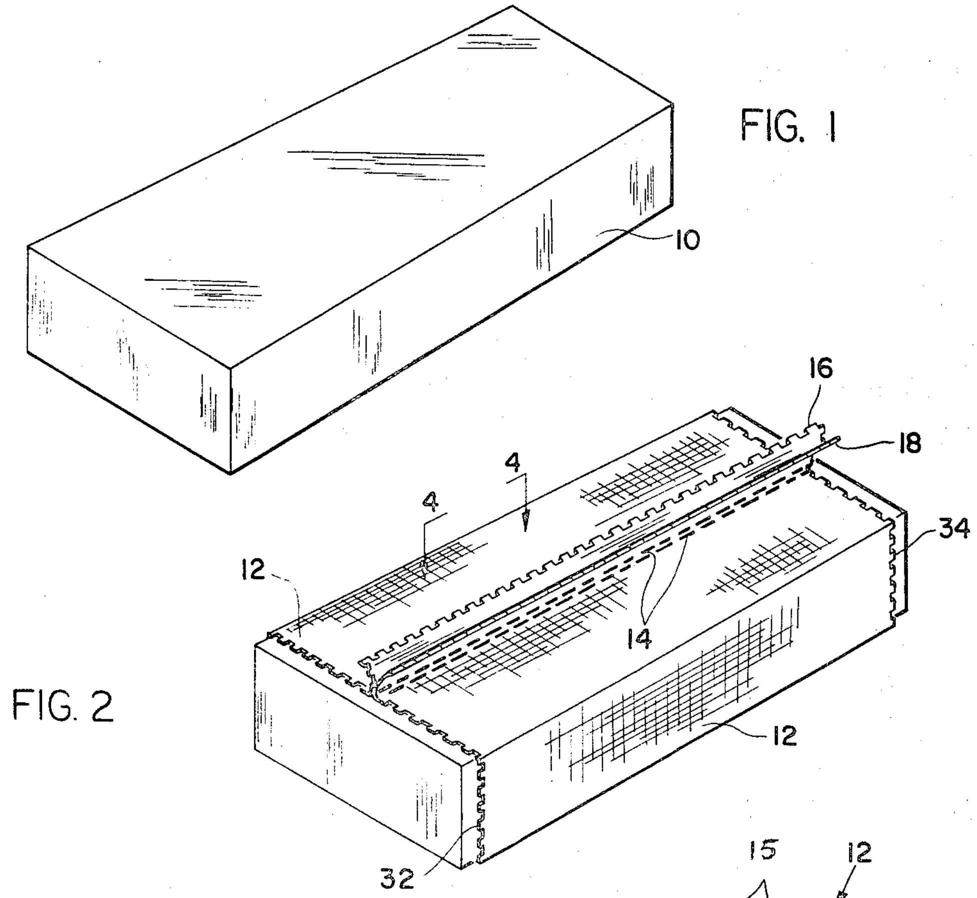
FIGURE 1 is a perspective view of the sponge material used in making the spaced roll shaped sponges of the window cleaning implement.
FIGURE 2 is a perspective view showing the sponge material covered with a netting material, the latter being sewed longitudinally to provide seamed edges suitable for use in fastening the netting covered sponge in the frame structure of the window cleaning implement.

The rectangular sponge 10, which is of a substantial length as compared to its width dimensions and of a substantial width as compared to its thickness dimensions, as best shown in FIGURE 1, is covered with a tight and snug fitting reticulated or netting material 12, whose opposing edges are sewed together horizontally and longitudinally adjacent the top surface of the sponge, as indicated in dotted lines at 14, to provide two extra long separable edge seams 16 and 18. It will be noted that the netting cover material 12 is slightly shorter in length than the sponge 10.

Figure 3:
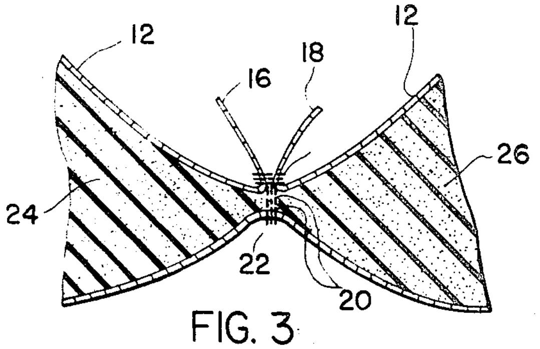
FIGURE 3 is a greatly enlarged fragmentary view of the netting covered sponge, showing its longitudinal stitching through its thickness dimensions, whereby the sponge material is formed into spaced roll shaped sponges as best shown in FIGURE 5.

After the rectangular sponge 10 is covered with its netting material 12 and stitched, as indicated at 14, the outwardly extending edge seams 16 and 18 are separable, and the sponge 10 with its netting cover material 12 are stitched by a plurality of vertical stitches between said separable edge seams 16 and 18, as indicated in dotted lines 20, through its thickness dimensions and along its longitudinal axis, as best shown in FIGURE 3. This stitching step with its vertical stitches 20 draws in the opposite sides of the sponge 10 and netting material 12 along its longitudinal axis, thereby forming a depression 22 in the compressible material and causing the laterally extending side portions thereof to form a pair of spaced roll shapes 24 and 26. Since the reticulated or netting cover material 12 is slightly shorter in length than the sponge 10, when the netting 12 and sponge 10 are stitched vertically together, as indicated at 20, a pair of spaced roll shaped sponges 24 and 26 are formed whose free ends will expand outwardly above the netting material 12 to form beaded finishing edges 28 and 30 at opposite ends of each roll shaped sponge 24 and 26. Such beaded finishing edges 28 and 30 serve as a protective edging to prevent the hands of an operator from coming into contact with the sharp irregular edges 32 and 34 of the netting material, as best shown in FIGURE 5.

The netting covered shaped sponge rolls 24 and 26 are now ready to be secured in a supporting frame structure 40. The edge seams 16 and 18 are brought together for positioning within a bifurcation 42, which forms a pair of fastening plates 44 and 46. The plates 44 and 46 are provided with an interlocking offset 47 to facilitate securing the edge seams 16 and 18 therein. It will be noted the fastening plates 44 and 46 are formed integrally with the main frame structure 40, and have angularly and laterally extending plates 48 and 50, which, in turn, provide suitable backing plates for the roll shaped sponges 24 and 26 during compression and deformation thereof while in use in the scrubbing of a surface 52 to be cleaned, as shown for example in FIGURE 7.

The opposite end of the supporting frame structure 40 has an angularly extending plate portion 56, which is also bifurcated as at 58. The bifurcation 58 forms a pair of backing plates 60 and 62 between which there may be clamped the base portion 64 of a rubber scraper blade or squeegee 66. The scraper blade or squeegee 66 may be used in the conventional manner to clear and dry the surface 52 to be cleaned of water or other cleaning liquid (not shown).

The intermediate portions of the fastening plates 44 and 46 are clamped together with the edge seams 16 and 18 of the netting material 12 therebetween by a series of longitudinally spaced clamping members consisting of a pair of rivets 68 and 70 and a pair of spaced bolts 72 and 74, as best shown in FIGURES 5, 6 and 7, so as to secure the pair of resilient roll shaped sponges 24 and 26 to the main frame structure 40. The bolts 70 and 72 in addition to clamping the fastening plates 44 and 46 also secure by nuts 75 an angular portion 80 of a looped metal handle receiving socket member 82, whereby the operator may manipulate the cleaning implement so as to clean the desired surface 52.

Thus, the handle socket member 82 of the cleaning implement may be held in the hand of the operator or may receive a handle extension member (not shown), and, after the pair of resilient roll shaped sponges 24 and 26 have been moistened, they may be pressed, preferably one at a time as illustrated in FIGURE 7, into contacting relation with the surface 52 to be cleaned. As the wet sponge 26 and its encompassing netting 12 are passed back and forth over the surface 52 any dried insect bodies or other solid particles will be softened by the moisture in the sponge 26 and by the abrasive action of the reticulated netting material 12 will be removed upon suitable pressure being applied thereto through the handle 82 by the operator. By using only one sponge roll at a time, there is always a reserve supply of moisture in the unused sponge roll in the event more moisture is desired to remove the dirt on the surface being cleaned. Of course, both roll sponges 24 and 26 may be used simultaneously, if desired. However, if both are used at the same time and more lubricant is required, it will be necessary to remoisten the roll sponges 24 and 26 from an outside source of supply (not shown).

After the surface has been thus cleaned by the abrasive action of the reticulated netting covered sponge rolls 24 and 26, the surface may be thereafter rinsed by compressing the roll shaped sponges against the surface being cleaned to release the residual absorbed water therefrom. In the event only one roll sponge is being used abrasively, the other sponge will provide the necessary rinse water by merely compressing it against the surface being cleaned.

Thereafter, the cleaned and rinsed surface 52 may be dried merely by the operator reversing the position of the implement handle 82 in his hand and drawing its rubber scraper blade or squeegee 66 over the rinsed and substantially dry surface to completely dry the same terminating the cleaning operation.

In the cleaning implement of the present invention, the sponge portion may comprise a natural sponge, expanded cellulosic materials known as artificial sponges, polyester sponges, sponge rubbers or other similar water absorbent compressible materials.

Figure 4:
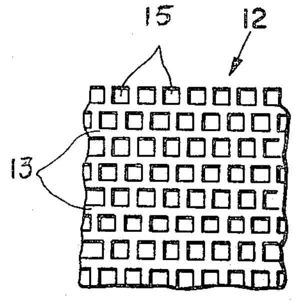
FIGURE 4 is an fragmentary view on an enlarged scale of the netting material, the same having been taken substantially along the line 4—4 of FIGURE 2, looking in the direction of the arrows.

The relatively stiff abrasive material of a reticulated plastic or wire in the form of a netting or screen, which is indicated in the drawings by the numeral 12, may be any suitable synthetic fibre, such as nylon, a polyester (Dacron [1]) or an acrylic (Orlon [1]), having regularly spaced and alternating strands 13 and interstices 15. (See FIGURE 4.) However, a nylon netting is preferable at

[1] Trademark.

the present time because of its high tensile strength, its high retention of strength when wet and its resistance to soaps, detergents, weak acids, alkalis and common solvents.

Although only one embodiment of the invention has been shown and described, it will be obvious to those skilled in the art that various changes in the form and relative arrangements of the parts may be made without departing from the scope thereof. Reference is therefore to be had to the appended claims for a definition of the limits of the invention.

What I claim is:

1. A cleaning implement comprising a frame structure extending laterally at an angle from the end of a handle receiving socket member, a rubber squeegee blade extending outwardly from one side of said frame structure and an absorbent member enclosed within a reticulated abrasive member extending outwardly from the opposite side of said frame structure, said absorbent member and said reticulated abrasive member being stitched together longitudinally to provide a pair of spaced roll shaped absorbent members, and means for securing said reticulated abrasive member within said frame structure.

2. The combination defined in claim 1 wherein a rectangular sponge member is enclosed within the reticulated abrasive member sewed together longitudinally and parallel to one of the larger surfaces of the sponge member to provide separable seamed edges for securing the same to said frame structure, said sponge member and its reticulated abrasive covering member being stitched together along its longitudinal axis to form a longitudinally extending depression and a spaced pair of roll shaped sponges encompassed by said reticulated member.

3. The combination defined in claim 1, wherein the frame structure extending from said handle receiving socket member is bifurcated along opposite edges for securing the rubber squeegee along one edge and the reticulated covered absorbent member along its opposite edge, said absorbent member being substantially of rectangular shape having the abrasive reticulated member encompassing the same, said reticulated member being stitched longitudinally to snugly enclose said absorbent member and to form longitudinally extending seamed edges along its inner surface area for securing the same in one of the bifurcations of said frame member, said absorbent member and its encompassing reticulated member being stitched between said longitudinally seamed edges through its thickness dimensions to form a longitudinally extending depression along its outer surface area to provide a spaced pair of roll shaped absorbent elements encompassed by the reticulated member.

4. The combination defined in claim 3, wherein the reticulated member is slightly shorter in length than the absorbent member so that when the spaced pair of roll shaped absorbent members encompassed by the reticulated member are formed there is provided a beaded finishing edge at opposite ends of each of the roll shaped absorbent members to serve as a protective edging for the sharp irregular edges of the reticulated member.

5. An absorbent member adapted to be used with a cleaning implement holder, said member having a substantial length as compared to its width dimension and a substantial width as compared to its thickness dimension, a reticulated abrasive sheet tightly and snugly encircling said absorbent member, the opposing edges of the reticulated member being sewed together horizontally and longitudinally adjacent the top surface of said absorbent member to provide two extra long separably edge seams for securing the same within a slot in said cleaning implement holder, said absorbent member and its encircling reticulated sheet being sewed together longitudinally through its thickness dimension whereby a depression is formed that extends longitudinally on the face thereof opposite said edge seams to provide a pair of roll shaped absorbent members encompassed by said reticulated sheet.

6. The invention defined in claim 5, wherein the reticulated sheet is slightly shorter in width than the length of the absorbent member whereby a beaded finishing edge is provided at opposite ends of each of the roll shaped members to serve as a protective edging for the sharp irregular edges of the reticulated member.

References Cited

UNITED STATES PATENTS

| | | | |
|---|---|---|---|
| 629,835 | 8/1899 | Wertsbaugher | 15—121 |
| 2,334,796 | 11/1943 | Steinmetz et al. | 15—121 |
| 2,891,270 | 6/1959 | Reiter | 15—209 XR |
| 2,958,885 | 11/1960 | Donney | 15—209 XR |
| 3,337,893 | 8/1967 | Fine et al. | 15—209 XR |

FOREIGN PATENTS

| | | |
|---|---|---|
| 1,340,774 | 9/1963 | France. |
| 248,755 | 1/1926 | Great Britain. |
| 854,652 | 11/1960 | Great Britain. |

DANIEL BLUM, *Primary Examiner.*